United States Patent [19]

Hira et al.

[11] Patent Number: 5,340,015

[45] Date of Patent: Aug. 23, 1994

[54] METHOD FOR APPLYING BRAZING FILLER METALS

[75] Inventors: Govind L. Hira, Columbia; Richard L. Hall, West Friendship; Gary I. Segal, Randallstown, all of Md.

[73] Assignee: Westinghouse Electric Corp., Pittsburgh, Pa.

[21] Appl. No.: 34,987

[22] Filed: Mar. 22, 1993

[51] Int. Cl.$^5$ .............................................. B23K 1/20
[52] U.S. Cl. ..................................... 228/205; 228/254
[58] Field of Search ................. 228/190, 254, 122, 205

[56] References Cited

U.S. PATENT DOCUMENTS

| | | | |
|---|---|---|---|
| 3,410,774 | 11/1968 | Barson et al. | 228/205 |
| 3,615,277 | 10/1971 | Kreider et al. | 228/190 X |
| 3,900,150 | 8/1975 | Delgrosso et al. | 228/254 X |
| 4,901,908 | 2/1990 | Negura et al. | 228/183 |
| 5,070,228 | 12/1991 | Siemers et al. | 219/76.16 |

OTHER PUBLICATIONS

*Brazing Manual* American Welding Society, 1963 pp. 73, 134, 135.

Primary Examiner—Kenneth J. Ramsey

[57] ABSTRACT

A method of applying brazing filler metal to a surface to form a brazed joint by plasma spraying the brazing filler metal on the portions of the surface to be joined.

7 Claims, No Drawings

METHOD FOR APPLYING BRAZING FILLER METALS

FIELD OF THE INVENTION

The present invention relates to a method of applying brazing filler metals to articles to be joined by brazing techniques.

BACKGROUND OF THE INVENTION

The joining of articles by filling the joint between the two articles with a low melting point material is known conventionally as brazing. Conventionally, brazing filler metals have a low melting point in relation to the articles being joined, sufficient mechanical strength when solid to create an effective joint and the ability to wet the surface of the articles being joined when the brazing filler metal is in the molten state. While pure metals and eutectic compositions having a single temperature melting point and are used for brazing, it is most common to use alloys of metals having a liquidus and solidus, rather than a single temperature melting point. In connection with the present invention, the term melting point will be used in a non-eutectic alloy to mean its solidus and its flow temperature will be used to indicate the liquidus. The term brazing filler metal is used herein to refer to the metal that is melted to form the braze joint, whether it be a pure metal or an alloy of two or more elements. The term brazing alloy is used herein to refer to a brazing filler metal that is a metallic alloy.

Conventional brazing techniques are used in a wide variety of applications. They may join dissimilar metals, similar metals, nonmetals such as graphite, metal matrix composites, metal coated articles such as an electroplated ceramic. In all these applications, some means of placing the brazing filler metal in the proper location, configuration and amount, compatible with the anticipated joint structure must be used. Conventionally, brazing filler metals are available as rods, ribbon, powder, paste, cream, wire, sheet, strip and foil. These forms of brazing filler metals may be further shaped to specific configurations specifically adapted to the configuration of the joint to be formed. The brazing filler metal so shaped is then place between the articles to be joined, the temperature raised to the flow temperature of the brazing filler metal and then reduced below the melting point to form the joint.

It is also known to electroplate at least one component of the brazing filler metal on portions of an assembly to be joined, with the material electroplated forming the brazing filler metal. In addition, recently there are available what are known as transfer tapes where the brazing filler metal and an adhesive are used to form a brazing filler metal configuration compatible with the configuration of the joint to be formed.

The major drawback with all of these forms of brazing filler metals is the relative difficulty in forming the brazing filler metal to the correct configuration and then retaining that shaped brazing filler metal in the proper location with respect to the anticipated joint through the brazing operation. While electroplating solves several of those shortcomings, it has its own unique shortcomings. For example, there exist restrictions on the compositions available for electroplating as it is difficult to electroplate certain alloy compositions that may be desired for a brazing filler metal. In addition, there is the requirement that the portions of a device not receiving the plating must be masked to prevent the entire article from receiving the electroplated brazing material.

Therefore, it is one object of the present to provide a method of brazing articles where the brazing filler metal is readily located only on the portions of the device forming the brazed joint. An additional object of the invention is to locate the brazing filler metal on the portion of the article to be joined without the necessity for complex fixtures or other means of physically retaining a separate article comprised of the brazing filler metal. Still a further object of the invention is to provide a method of brazing articles adapted to automation.

Still further objects of the invention will be apparent to those skilled in the art, especially in light of the present specification.

SUMMARY OF THE INVENTION

To achieve these and other objects of the invention, there is provided the method of joining two metal surfaces by brazing. First and second metal surfaces are joined by first cleaning the surfaces, impinging plasma on portions of the surface, and then applying a brazing filler metal to at least the first surface by plasma spraying the brazing filler metal on the first surface to form a first coated surface. The first coated surface is then abutted to the second surface and heated above the melting point of the brazing filler metal while maintaining the first coated surface and the second coated surface in an abutting relationship. The brazing filler metal is then cooled below its melting point while maintaining the first coated surface and the second surface in the abutting relationship. Preferably, the brazing filler metal forms a fillet at the abutment of the first and second surfaces with the fillet having a radius of 0.060 inches (1.52 mm) or less.

DESCRIPTION OF THE PREFERRED EMBODIMENT

The present invention has been used to fabricate an aluminum antenna. While such an article had identical compositions for the components to be joined, the present invention is not limited to the joining of like materials. The articles to be joined may be two metal articles of the same or different compositions, one or both of the materials may be metal matrix composites, or one or more of the surfaces to be joined may comprise a metal coating or a nonmetallic article. Further, ceramics or pure nonmetallic materials such as graphite may be joined as long as such material is capable of receiving an appropriate brazing filler metal having a melting point below thermal degradation temperatures of the articles to be joined and they can be wetted by such a brazing filler metal.

In the preferred embodiment an aluminum alloy having the designation 6061T6 was joined to a like alloy using a brazing alloy known as BaAlSi-4. This alloy has a composition of silicon 11–13%, copper 0.30%, iron 0.8%, zinc 0.2%, magnesium 0.1%, other materials 0.05%. This alloy is also referred to as 4047 aluminum alloy and is normally available in wire or sheet form.

Prior to applying the brazing filler metal, the surfaces to be joined are cleaned. This cleaning can be done by a number of methods as long as those methods are compatible with the application of the parts being joined. Shot blasting, sand blasting and chemical cleaning, and combinations thereof, are the most common means of preparing the surface to be brazed.

One of the advantages of the invention is that subsequent to the cleaning operation there is no manual application of the brazing filler metal, as for example a foil piece, that could inadvertently introduce contaminants such as skin oils to the surface that has been cleaned.

In connection with the preferred embodiment of the present invention, chemical cleaning, glass shot blasting, or the like are not needed to prepare the surface for the application of the brazing filler metal. Where necessary surface oxides can be removed by rubbing the surface with an abrasive pad. The surface is then prepared by impinging a high velocity plasma (without brazing filler metal) in a direction orthogonal to the surface onto the surface. This cleaning step also results in a preheating of the part to be brazed which helps to reduce warpage of the part.

The process further includes the step of limiting the application of the brazing filler metal to a desired location. In the embodiment disclosed, the spray pattern was local enough such that the brazing filler metal was applied only to the portions of the surface forming the brazed joint. Alternatively, the surfaces can be masked but this introduces at least one additional process step. Where a masking step is used portions of the surfaces not desired to receive the brazing filler metal were shielded using a water soluble graphite/glycerol antibond paint to limit the extent of the application of the plasma sprayed. The brazing filler metal may also be limited by use of metal or composite shields or other means of limiting either the application or the adherence of the plasma sprayed brazing filler metal.

Subsequent to cleaning the surfaces to receive the brazing filler metal a brazing filler metal is applied to at least one of the surfaces by plasma spraying the brazing filler metal on that surface to form a first coated surface. In the preferred embodiment a coating of the BAlSi-4 brazing material, approximately 0.005 inches (1.3 mm) thick, was applied to the aluminum parts at the desired location by plasma spraying.

Plasma spraying is a type of thermal spray techniques in which metal powder is injected into a plasma induced by electric current in an inert gas. The plasma spray device was held 100–150 millimeters away from the aluminum piece receiving the spray, the spray rate was 4.5 kilograms per hour, the coverage was 13.4 $m_2/hr/0.1$ mm. The powder weight was 0.32 $kg/m_2/0.1$ mm. The deposition rate was 3.4 kilogram per hour. The arc used to generate the plasma had an amperage of 500 and a voltage of 70 to 80, the gas was a mixture of nitrogen and hydrogen, with primary gas pressure of 3.45 bars, with a secondary gas pressure of 3.45 bars. These parameters are applicable to the particular brazing filler metal being plasma sprayed. The plasma spraying of powders for purposes of building up surfaces, applying coatings, and the like is well known and one skilled in this art can readily apply coatings of brazing filler metal materials without undue experimentation using parameters known to be applicable for the use of the specific powders being applied.

In the application of the preferred embodiment, the brazing filler metal was applied to only one side of the two surfaces to be joined. This was adequate to provide an effective brazed joint, however, for some applications it may be desirable to coat both surfaces to be joined with the plasma sprayed brazing filler metal. In the preferred embodiment the brazing filler metal was applied to the surface with the coating having a thickness in the range of from 0.004 to 0,006 inches (0.10 to 0.15 mm).

Subsequent to the application of the brazing filler metal, the surfaces to be joined are placed in an abutting relationship. Numerous means are used in the prior art to maintain articles in an abutting relationship during a brazing operation and such conventional means may be utilized with the present invention.

With the surfaces to be joined in the abutting relationship, the brazing filler metal is heated above its melting point. The means used to heat the brazing filler metal above its melting point were not critical to the present invention. The immersion of such articles in a molten salt bath, i.e., dip brazing, the application of local heating by means of torches, lasers, induction heaters and the like may be utilized as with conventional brazing techniques.

As noted above, the term melting point in connection with the present application is intended to be synonymous with the solidus of a non-eutectic filler metal and for some applications heating of the brazing alloy above its liquidus may be necessary to induce flow of the brazing alloy to all desired locations of the joint being formed.

In connection with the preferred embodiment of the invention, the brazing alloy was melted by submerging the articles to be joined in a molten salt bath at a temperature in the range of from 1080° to 1120° F. The joined articles were then removed from the molten salt bath and cooled to below the melting point of the brazing alloy. Residual salt on the article was removed and the brazed joint was then subjected to evaluation. That evaluation indicated a visually sound joint at a significantly reduced potential cost due to the elimination of manual location of the previously used foil coupons associated with the brazed joint formed by conventional brazing techniques.

The use of plasma spraying to apply brazing filler metals to parts to be joined thus provides effective joints without significant manual labor associated therewith. In addition, plasma spraying does not ordinarily require the preheating of the article being coated by the applied spray. Thus, distortion and thermal induced degradation of the articles to be joined is minimized by this technique.

The present invention has been disclosed in terms of a preferred embodiment. The scope of the invention, however, is not limited thereto but is determined by the appended claims and their equivalents.

What is claimed is:

1. A method of joining two metal surfaces by brazing, comprising the steps of:
   providing first and second metal surfaces to be joined;
   cleaning said surfaces by impinging a high velocity plasma spray on said surfaces, said plasma spray being directed generally orthogonal to said surfaces;
   limiting the application of a brazing filler metal to a desired location on said first surface;
   applying said brazing filler metal to at least said first surface by plasma spraying said filler metal on said first surface to form a first coated surface;
   abutting said first coated surface to said second surface;
   heating said brazing filler metal above its melting point while maintaining said first coated surface and said second surface in an abutting relationship; and cooling said brazing filler metal below its melting point while maintaining said first coated surface and said second surface in an abutting relationship.

2. The method of claim 1 wherein the step of heating said brazing filler metal comprises surrounding said filler metal with a molten material.

3. The method of claim 1 wherein said brazing filler metal forms a coating on said first coated surface, said coating having a thickness in the range of from 0.004 to 0.006 inches.

4. The method of claim 1 wherein said metal surfaces comprise the surfaces of metal articles.

5. The method of claim 4 wherein said metal articles comprise composite materials having a metal matrix.

6. The method of claim 1 wherein said metal surfaces comprise metal coatings on nonmetallic articles.

7. The method of claim 6 wherein said nonmetallic articles have a composition selected from the group consisting of ceramics and composite materials having a nonmetallic matrix.

* * * * *